US008585408B2

(12) United States Patent
Margiotta

(10) Patent No.: US 8,585,408 B2
(45) Date of Patent: *Nov. 19, 2013

(54) METHOD AND SYSTEM FOR PROVIDING GAME-RELATED INCENTIVES TO SALES PROFESSIONALS IN A VIRTUAL ENVIRONMENT

(71) Applicant: Vince Scott Margiotta, Coppell, TX (US)

(72) Inventor: Vince Scott Margiotta, Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,341

(22) Filed: Dec. 31, 2012

(65) Prior Publication Data
US 2013/0122472 A1    May 16, 2013

Related U.S. Application Data

(63) Continuation of application No. 13/244,242, filed on Sep. 23, 2011, now Pat. No. 8,342,845, which is a continuation of application No. 11/423,995, filed on Jun. 14, 2006, now Pat. No. 8,047,848.

(60) Provisional application No. 60/690,943, filed on Jun. 16, 2005.

(51) Int. Cl.
*G09B 19/18* (2006.01)

(52) U.S. Cl.
USPC ........... 434/107; 434/109; 434/219; 434/365; 705/1.1; 283/115

(58) Field of Classification Search
None
See application file for complete search history.

(56) References Cited

U.S. PATENT DOCUMENTS

| 2003/0156134 | A1* | 8/2003 | Kim ............................ 345/753 |
| 2005/0021472 | A1* | 1/2005 | Gettman et al. ............... 705/52 |
| 2005/0095569 | A1* | 5/2005 | Franklin ....................... 434/350 |
| 2005/0137015 | A1* | 6/2005 | Rogers et al. ................. 463/42 |

* cited by examiner

*Primary Examiner* — Xuan Thai
*Assistant Examiner* — Banafsheh Hadizonooz
(74) *Attorney, Agent, or Firm* — Galvin Patent Law LLC; Brian R. Galvin

(57) ABSTRACT

A method, comprising the steps of (a) representing users within a virtual environment, the virtual environment residing on one or more computers, comprising the steps of (b) collecting data pertaining to one or more of the users' activities not associated with the virtual environment relating to each of the users' performance on business-related tasks, (c) awarding incentives including points, badges, levels, prizes, etc. to a plurality of users in the virtual environment based on the collected data pertaining to the users, (d) providing information regarding a first user's incentives to at least a second user involved in activities related to the business-related tasks performed by the first user, and (e) updating the collected data in the virtual environment as the data pertaining to the performance of users changes.

16 Claims, 1 Drawing Sheet

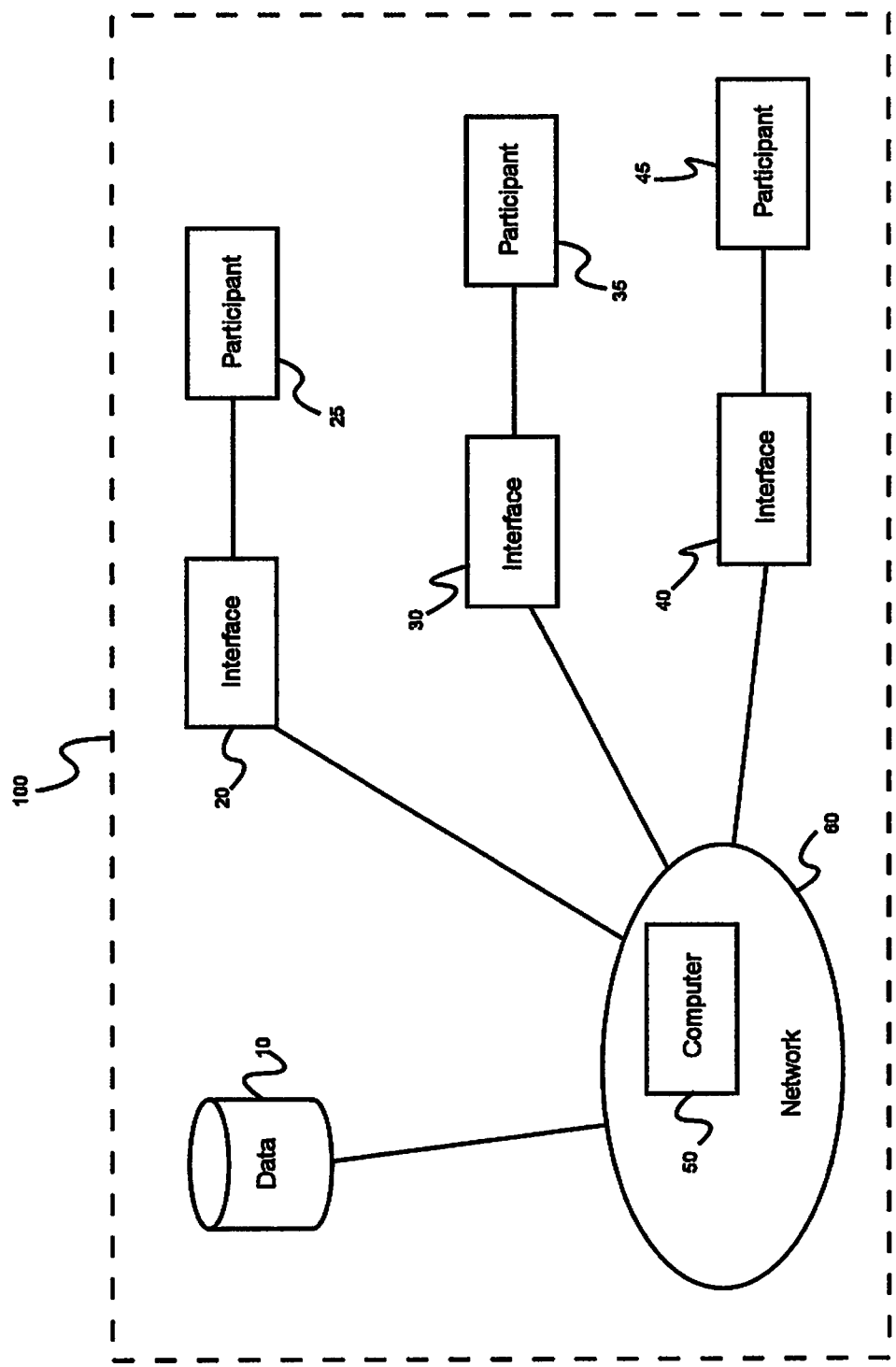

METHOD AND SYSTEM FOR PROVIDING GAME-RELATED INCENTIVES TO SALES PROFESSIONALS IN A VIRTUAL ENVIRONMENT

CROSS-REFERENCE TO RELATED APPLICATIONS

The present invention is a continuation of U.S. patent application Ser. No. 13/244,242, titled "METHOD AND SYSTEM FOR PROVIDING INCENTIVES IN A BUSINESS ENVIRONMENT", which was filed on Sep. 23, 2011, and which is a continuation of U.S. patent application Ser. No. 11/423,995, now issued as U.S. Pat. No. 8,047,848, titled "Method and System for Providing Incentives in a Business Environment" and filed on Jun. 14, 2006, which claims priority to U.S. Provisional patent application Ser. No. 60/690,943, titled "Method of Coordinating an Interactive Computer Game with Business Processes, People and Systems", filed on Jun. 14, 2005. The disclosure of each of the above-referenced patent applications is hereby incorporated by reference in its entirety.

BACKGROUND OF THE INVENTION

This invention relates to multi-player interactive computer games, methods, and apparatus for use in a performance management and learning environment to interact with business processes and systems.

Computer games are a very popular form of contemporary entertainment. More recently, multi-player computer games have become popular. In this type of computer game, a player runs a computer game version on his local computer. This game version acts as a client that can connect to a central server; generally, this connection is made over the Internet. In general, both the client and server computers maintain a shared representation of the state of a virtual environment in which the game is played. Consequently, these games are typically called networked virtual environment, or net-VE, games. Changes made by a player to his local client representation are sent to the server, and then the server propagates those changes to each of the other clients. Similarly, changes made by the server to the server-side simulation are also propagated to all connected clients. This multi-player arrangement allows a player not only to interact with the virtual environment, but also to interact with the virtual characters controlled by other players.

Though digital computer games are usually thought of as consumer entertainment, games to teach and learn have gained early success, especially in the military. The military's use of computer games in learning environments is driving the use of games to teach and learn. This learning environment can be viewed as a combination of Massively Multiplayer Online games (MMOGs), Massive Multiplayer Online Role Playing games (MMORPGs), distributed simulators, computer aided instruction, and learning systems. Computer games are emerging to support military and national defense applications, and will likely be used more often in the business sector in the future. Thus, there is a need for more engaging, educational interactions between employees and enterprise processes.

BRIEF SUMMARY OF THE INVENTION

A method carried out by identifying acts related to enterprise performance; generating a competitive training environment, the environment including situations that model work situations requiring the acts; presenting the environment to a participant; and receiving interaction of the participant with the environment by the participant perceiving the situations and making inputs to the environment that model the acts in order to assess or improve participant skills related to enterprise performance. A system including a data component that stores data indicative of a work environment and data indicative of acts related to enterprise performance; a competitive environment generation component assimilates the data into a competitive environment that models work situations and; an interface component that presents the competitive environment to a participant and permits a participant to respond to the model work situations. A method carried out by generating a computer game where the situations presented in the game model job situations; engaging a worker as a game participant requiring the worker to advance in the game by providing appropriate inputs, the inputs to the game modeling acts that contribute to enterprise performance. Alternatively, the methods may be carried out by tracking the actual job performance of a participant and assimilating the actual job performance data into a virtual game environment such that the game is an illustration of actual job performance, thus portraying the actual relative performance of all participants.

BRIEF DESCRIPTION OF THE DRAWINGS

FIG. 1 is a block diagram representing a system in accordance with embodiments of the present invention.

DETAILED DESCRIPTION

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections. It is further noted that all functions described herein may be performed in either hardware or software, or a combination thereof, unless indicated otherwise.

In accordance with various embodiments of the present invention, FIG. 1 is a block diagram of a system 100 for coordinating business processes into a competitive environment for training. The system 100 includes a data component 10 that stores data including data indicative of a work environment and data indicative of acts related to enterprise performance. A competitive environment generation component includes a host computer 50 that assimilates data into a competitive environment, the competitive environment modeling various work situations. Three participants 25, 35, and 45, who may be at the same location or different locations all of which may be remote to the computer 50, are presented the competitive environment via interfaces 20, 30 and 40, respectively. The interfaces 20, 30, and 40 permit the participants 25, 35, and 45 to perceive and make inputs related to the model work situations. For purposes of this example, assume interfaces 20, 30, and 40 are personal computers remotely connected to the host computer 50 over the Internet via a network 60.

In alternative embodiments, the system 100 might comprise a single participant on a single computer where the data component, competitive environment generation component, and interface are in an integrated and self-contained system where the data and competitive environment reside in the self-contained system. Any number of alternative system arrangements may effectively carry out the methods of the present invention.

The methods may be carried out in various embodiments by identifying human acts related to enterprise performance; generating a competitive training environment, the environment including situations that model work situations requiring the human acts; presenting the environment to a participant; and receiving interaction of the participant with the environment by the participant perceiving the situations and making inputs to the environment that model the human acts in order to assess or improve participant skills related to enterprise performance. Some embodiments of the methods can be carried out by generating a computer game where situations presented in the game model job situations. Such methods further comprise engaging a participant in a game, thus requiring the participant to advance in the game by providing appropriate inputs, the inputs to the game modeling human acts that contribute to enterprise performance. Alternatively, the methods may be carried out by tracking the actual job performance of a participant and assimilating the actual job performance data into a virtual game environment such that the game is an illustration of actual job performance, thus portraying the actual relative performance of all participants.

For illustrative purposes only while describing FIG. 1, consider that the participants 25, 35, 45 are operators at a call center for company X that provides mobile phones that may also be integrated organizational devices, and related services. Data 10 include specific human acts related to enterprise performance, which in this case could be "canned" responses operators are to know that, for example, assess a caller's situation and provide instructions to address the caller's question/issue. Such responses, when monitored by company X while an operator is on a call, whether an actual call or call during a training/game situation, provide the company a means of evaluating the skills of the operator that directly relate to performance of the company/enterprise. The data also includes data necessary to generate a competitive environment; in this case, caller scenarios where callers present various common issues to the operators. Thus, data 10 may include a plurality of acceptable participant/operator responses that relate to a plurality of different questions and issues presented by a caller. The data may further include historical data showing both the actual and training performances of a participant, thus assessing the evolution of the participant's skills over time and tracking the rate of improvement. The data from training results might also be compared to actual performance results, where appropriate, to assess the effectiveness and accuracy of the training; whether the skill level indicated by the training reflects the skill level demonstrated during "live" calls. Such data collection, comparison, and reflection of actual performance data may occur in real time as actual results are generated and/or training results are generated.

During the training/game, the participants 25, 35, and 45 are all simultaneously presented with a model work situation, in this case a caller scenario, such as in an animated "game" environment on the computer screen including audio via interface 25, 35, 45. The situation is designed to elicit a desirable act/response from the participants. For example, the model situation presented by the competitive training environment may be an animated caller on the computer monitor needing help setting up e-mail downloads to her integrated phone. A desirable input/response/question from the participant/operator is whether the caller knows the name of the e-mail server. The participants may each separately provide inputs/responses to the situation, the system receiving the inputs from each participant. The system compares the input of a participant to the desired input and scores the participant's input as either acceptable or unacceptable.

At this point the competitive training environment/game may be tailored to proceed in a variety of ways. For example, the system may move on to present another situation to the participants. Alternatively, the "game" may issue the desired input back to the participants so the participants are reinforced as to the desired response. In other embodiments, the competitive environment is designed such that participants do not advance to the next situation in the game unless the participant succeeds in the situation, such as by providing a desired input. Thus, participants can compete based on the speed with which they advance through situations relative to other players/participants. The system may assess any number of performance parameters from a participant's inputs, such as timeliness, accuracy, and clarity.

The system may evaluate the inputs of the participants and display the cumulative results as the participant's "score" during the course of a game/training session. Thus, with the three participants 25, 35, and 45 of FIG. 1, the scores of the all the participants may be visible to each participant, creating a game in which the participants compete with each other. In alternative embodiments, a plurality of participants may participate in a game creating an engaging training technique for a business/enterprise. Each time a participant takes part in a game the system tracks prior game results and the participant may see historical scores and best scores in order to set personal goals and measure improvement. A plurality of different competitive environments may be tailored to assess/train a plurality of different skills for a plurality of different types of businesses. Of course, games played within a virtual environment may also comprise activities not directly related to training (for example, scaling a virtual mountain as a team), while players may receive status, reputation, incentives, or game-specific benefits such as special tools, weapons, or skills for use in the game, based on received data pertaining to the players' performance on business-related tasks outside of the virtual environment.

The systems and methods of the present invention may be employed in any number of applications, non-limiting examples of which might be computer help desks, emergency personnel, equipment operators, medical techniques, sales people, and the like. Further, the competitive training environment may be adapted to the needs of any enterprise, for instance, rather than competing directly and openly against other participants, a game may be designed such that a participant competes only against his or her own historical performance, thus seeking to improve on a best prior "score". Or, a participant may only compete against other "players" generated by the competitive training environment. In still another alternative, participants may compete against other participants anonymously or such that only appropriate management personnel, for example, are aware of the results.

In another embodiment of the invention, a competitive or "game" virtual environment is adapted to reflect actual performance of workers. A central control establishes a large virtual environment that is intended to represent a business process or organization with specific performance parameters that are desired; alternatively, the large virtual environment may be unrelated to enterprise performance, but use data pertaining to participants' real enterprise performance outside of the virtual environment to provide incentives or capabilities to the participants within the virtual environment. Participants, who may in real life be single individuals, groups, teams, or any other performing entities, each select or are assigned a game character to represent them and to interact in a game with other virtual characters controlled by other participants. Each participant can directly control or influence their specific character's successful advancement within the game by achieving the specific real life company parameters pre-established by the participant or company/enterprise. The real life company objectives, goals, or metrics may be desired and expected performance parameters for participants in their business activities outside of the virtual environment. As a participant (e.g., employees, contractors, suppliers, etc.) accomplishes desired activities and achieves desired results in real life, the results can be reported to the central control and reflected in the game by advancing the participant's representative character relative to other characters. It is likely that the results of many participants will be reflected, thereby creating an engaging, interactive, and competitive environment where participants are actively attempting to win the game by achieving their real world business objectives and thereby advancing their character within the game.

In accordance with another embodiment of the invention, participants' real life performance metrics are entered into a database and compared to the company's desired performance parameters and metrics for the participant, team, group, etc. Each entry by a participant will either advance the participant's unique character in the game if they are successfully achieving company desired metrics, or the game may provide specific instructions on how to improve performance and thereby advance in the game, or alternatively the game may deliver some other consequence or recommendation based on the participant's performance relative to the performance desired for the participant by the participant's company.

In yet another embodiment, a participant's or team's game performance is used to determine corrective actions necessary to improve both game and real life performance related to predetermined parameters or objectives. The game captures data from many participants and the data can be used to compile performance norms within common pier groups. The captured data could reflect specific activities, the frequency of activities, and other pertinent performance information for both high and low performers, thus providing valuable statistics that can be used to teach and encourage other participants and potential participants.

Another embodiment involving the competitive training environment reflects the real world performance of sales people. Each sales person or a sales team would select a game character to compete against other sales teams in the company. Sales skills, such as closing ratios, qualifying skills, lead conversion skills, etc., could be calculated and other indicators, such as prospecting calls, number of appointments, number of sales contracts, revenue sold, etc., could be measured. These skills and other indicators could be compared to a pre-determined set of parameters, established by a company's sales management, and as the sales person or team accomplishes the parameters, their game character advances in the virtual competitive environment. To make the game competitive, sales managers and all game players could be able to easily view the progress of all players and teams in the game. High performing sales people could be recognized by management and their best practices emulated, while low performing sales people could be quickly identified, thus providing management with meaningful individual and team related performance information that could be used to design and deliver targeted training.

In accordance with another embodiment, a central control includes a central server and central database. The central control may be an actual, real-time control or may be a "pre-programmed" control in which participants update the central database with performance achievements or parameters, and the central control updates all new data and player/participant advancements at pre-determined time intervals. All participant computers and the central server maintain shared representations of a common simulation. The central server maintains a simulation of the entire virtual competitive environment, and each participant computer maintains a simulation of the participant's own virtual environment. The central server and participant simulations are coordinated by passing messages between the participant's computer and the central server. Such messages may be passed over the Internet.

In additional embodiments, methods of present invention may be carried out by assimilating non-simulation computer generated data, software databases, or manually generated data into an animated video or computer game format. For example, an individual's, group's, or organization's existing performance data, such as from CRM systems/databases, could be converted into a game format as described herein.

Although exemplary embodiments of the invention have been disclosed, it will be apparent to those skilled in the art that various changes and modifications can be made which will achieve some of the advantages of the invention without departing from the spirit and scope of the invention. For example, it will be obvious to those reasonably skilled in the art that, although the description was primarily directed to a particular hardware system and operating system, other hardware and operating systems could be used in the same manner as that described. Other aspects, such as the specific instructions utilized to achieve a particular function, as well as other modifications to the inventive concept are intended to be covered by the appended claims.

What is claimed is:

1. A method comprising:
   representing a plurality of sales professionals as characters or entities within a virtual environment, the virtual environment residing on one or more computers;
   collecting data pertaining to one or more of the sales professionals' activities not associated with the virtual environment relating to each of the users' performance on sales-related tasks;
   awarding game-related incentives within the virtual environment to the plurality of sales professionals' characters or entities in the virtual environment based on the collected data pertaining to the sales professionals;
   providing information regarding a first sales professional's incentives to at least a second sales professional involved in activities related to the sales-related tasks performed by the first sales professional; and
   updating the collected data in the virtual environment as the data pertaining to the performance of sales professionals changes.

2. The method of claim 1, wherein the sales professionals comprise employees of an enterprise.

3. The method of claim 1, wherein the sales professionals comprise employees of a plurality of channel partners of an enterprise.

4. The method of claim 1, wherein the sales professionals comprise customers of an enterprise.

5. The method of claim 1 wherein the virtual environment is animated.

6. The method of claim 1 wherein the data pertaining to the first sales professional's sales-related activities not associated with the virtual environment is compared to the data pertaining to at least a second sales professional's sales-related activities not associated with the virtual environment for competitive, engagement, or user adoption effect.

7. The method of claim 1, further comprising tracking incentives of the sales professionals within the virtual environment in order to determine the first sales professional to achieve a predetermined goal.

8. The method of claim 1, further comprising simultaneously displaying relative performance of the plurality of sales professionals within the virtual environment to promote competition between the sales professionals.

9. A system comprising:
   a virtual environment residing on one or more computers;
   wherein a plurality of sales professionals are represented as characters or entities within the virtual environment; and
   wherein data collected from the sales professionals' historical performance on sales-related tasks, the data pertaining to sales-related activities conducted outside the virtual environment by the plurality of sales professionals, is attributed to each respective sales professional's character or entity within the virtual environment;
   wherein the sales professionals receive game-related incentives within the virtual environment based on the collected data; and
   wherein information regarding the game-related incentives is made available to a plurality of the sales professionals.

10. The system of claim 9, wherein the game-related incentives are stored and cumulatively tracked within the virtual environment.

11. The system of claim 9, wherein the data further comprises the sales professionals' sales or other sales-related metrics obtained based on the sales professionals' sales-related performance outside of the virtual environment within a designated period.

12. The system of claim 9, wherein the sales professionals comprise a plurality of employees, independent contractors, agents, resellers, distributors, partners, or vendors of an enterprise.

13. The system of claim 9, wherein the virtual environment is animated.

14. The system of claim 9, wherein the data pertaining to a first sales professional is compared to the data pertaining to a plurality of other sales professionals for competitive, engagement or user adoption effect.

15. The system of claim 9, further comprising tracking the game-related incentives of the plurality of sales professionals or of their characters or entities within the virtual environment in order to determine a first sales professional to achieve a predetermined goal.

16. The system of claim 9, further comprising simultaneously displaying the relative performance of the plurality of sales professionals within the virtual environment to promote competition and engagement between the sales professionals.

* * * * *